(12) United States Patent
Chen et al.

(10) Patent No.: US 8,662,463 B2
(45) Date of Patent: Mar. 4, 2014

(54) TEMPORARY BRACKET

(75) Inventors: Yun-Lung Chen, New Taipei (TW);
Chuan-Kai Chang, New Taipei (TW);
Tsung-Te Tai, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 195 days.

(21) Appl. No.: 13/296,532

(22) Filed: Nov. 15, 2011

(65) Prior Publication Data

US 2012/0286113 A1 Nov. 15, 2012

(30) Foreign Application Priority Data

May 12, 2011 (CN) .......................... 2011 1 0122505

(51) Int. Cl.
*A47G 29/00* (2006.01)
*A45D 42/14* (2006.01)
*A47F 1/04* (2006.01)
*A47B 81/02* (2006.01)

(52) U.S. Cl.
USPC ..................... 248/309.3; 248/683; 248/205.5; 248/206.2; 248/304; 248/322; 248/339; 248/309.1; 211/60.1; 211/65; 211/69.9; 211/86.01; 211/87.01; 4/559; 4/568; 4/605

(58) Field of Classification Search
USPC ................ 248/309.3, 683, 205.5, 206.2, 467, 248/225.21, 690, 692, 227.1, 301, 303, 304, 248/322, 339, 363, 221.11, 205.6–205.9, 248/206.1–206.4, 220.21, 309.1; 211/60.1, 211/65, 69.9, 86.01, 87.01; 4/559, 568, 605
See application file for complete search history.

(56) References Cited

U.S. PATENT DOCUMENTS

| | | | | |
|---|---|---|---|---|
| 4,867,402 A * | 9/1989 | Benson et al. | ............. | 248/206.3 |
| 4,979,708 A * | 12/1990 | Aoki | ............................. | 248/110 |
| 6,330,948 B1 * | 12/2001 | Leto | ............................. | 211/70.6 |
| 6,619,604 B1 * | 9/2003 | Stillman | .................... | 248/205.5 |
| 6,854,852 B1 * | 2/2005 | Zadro | .......................... | 359/840 |
| 2004/0099624 A1 * | 5/2004 | Hein | ......................... | 211/89.01 |
| 2009/0090828 A1 * | 4/2009 | Junkins | .................... | 248/220.21 |
| 2012/0292467 A1 * | 11/2012 | Chen | .......................... | 248/206.2 |

\* cited by examiner

*Primary Examiner* — Terrell McKinnon
*Assistant Examiner* — Christopher Garft
(74) *Attorney, Agent, or Firm* — Altis Law Group, Inc.

(57) ABSTRACT

A temporary bracket includes a mounting bracket, an absorbing dish, and a placing member. The mounting bracket includes a mounting body. A mounting opening is defined in the mounting body. The mounting opening includes a wide part and a narrow part communicating with the wide part. The absorbing dish includes a suction cup for sucking a surface, a neck portion extending from the suction cup, and a securing portion extending from the neck portion. The neck portion is disposed in the narrow part. The securing portion is used for extending into the wide part and moves to the narrow part to enable the neck portion to be disposed in the narrow part. The placing member is secured to the mounting bracket for supporting an object.

15 Claims, 6 Drawing Sheets

TEMPORARY BRACKET

BACKGROUND

1. Technical Field

The disclosure generally relates to a temporary bracket with a simple structure.

2. Description of Related Art

People use a lot of commodities in daily life, such as a pen, a toothbrush, a razor or a soap. These commodities are usually placed on a platform, such as a desk, which takes a lot of room, instead of being hung or secured above or on the side of the platform.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
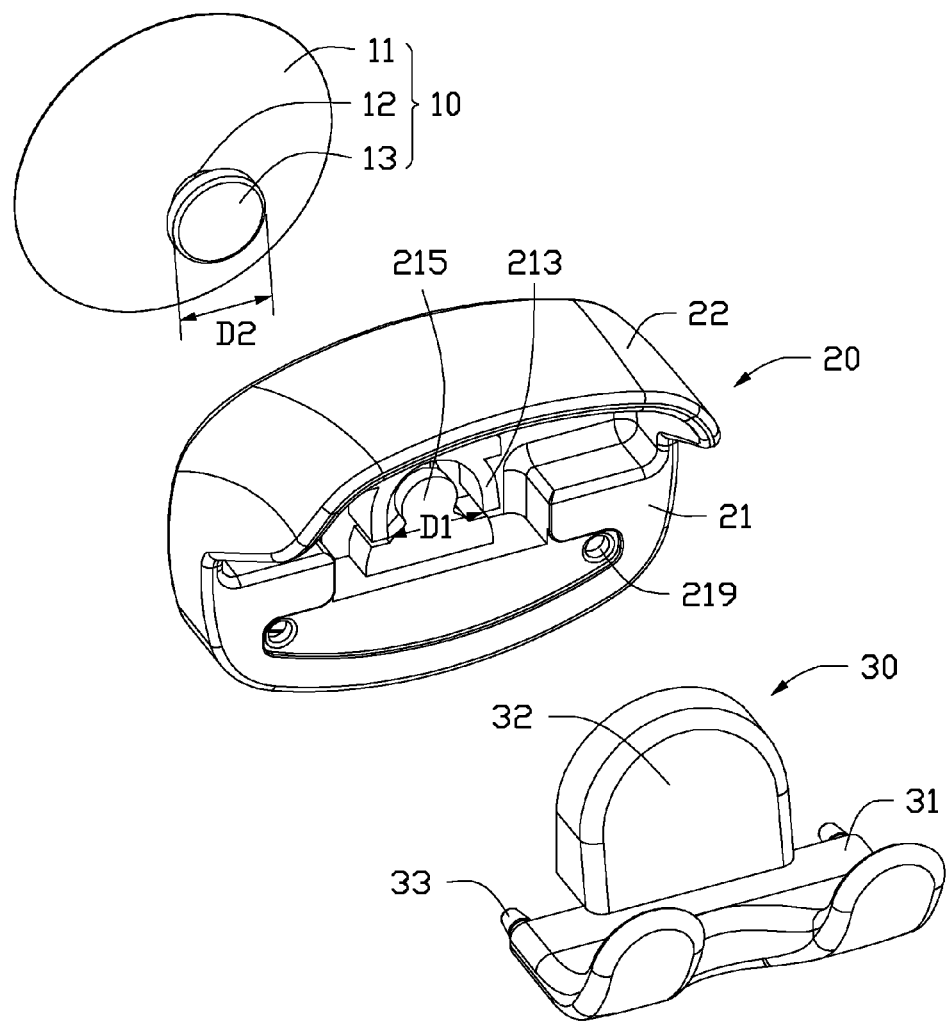
FIG. 1 is an exploded, isometric view of an embodiment of a temporary bracket.
Figure 2:
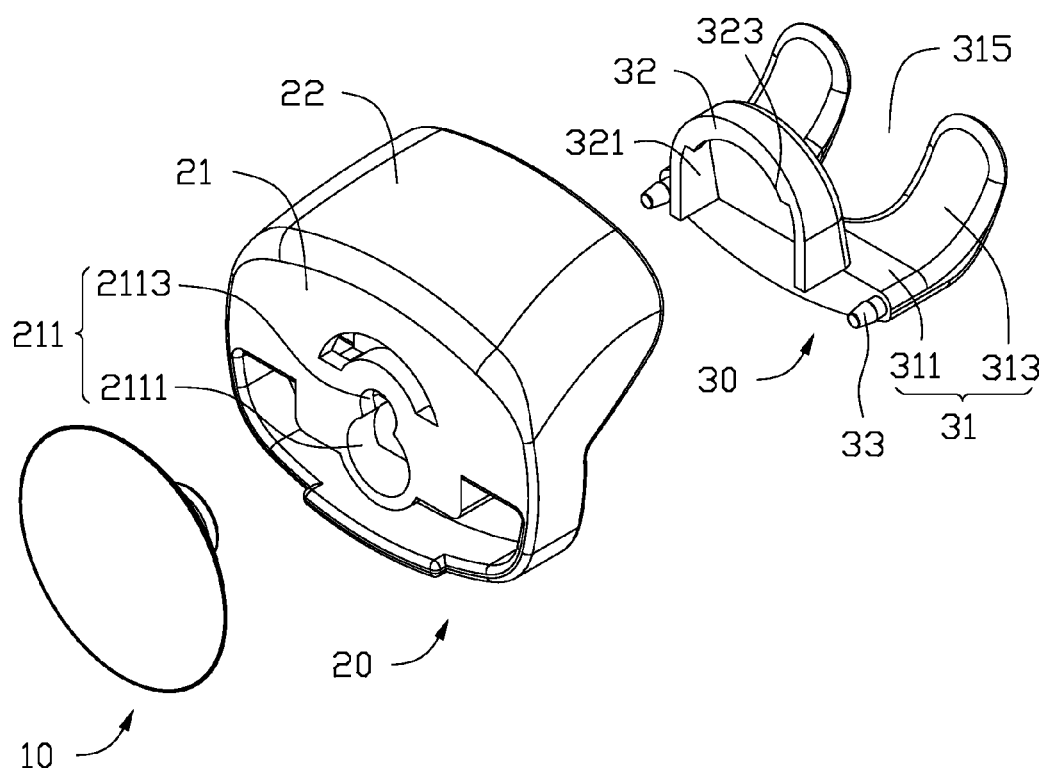
FIG. 2 is similar to FIG. 1, but viewed from another aspect.

Referring to FIGS. 1 and 2, one embodiment of a temporary bracket is shown. The temporary bracket includes an absorbing dish 10, a mounting bracket 20, and a placing member 30. In one embodiment, the temporary bracket is used for supporting a shaving razor 50 (shown in FIG. 6).

The absorbing dish 10 includes a suction cup 11, a neck portion 12 extending from the suction cup 11, and a securing portion 13 extending from the neck portion 12. The cross-sectional size of the neck portion 12 is less than that of the securing portion 13 (shown in FIG. 5). In an embodiment, the diameter of the neck portion 12 is less than that of the securing portion 13.

Referring to FIGS. 1 and 2, the mounting bracket 20 includes a mounting body 21 and a cover tab 22 extending from the mounting body 21. A mounting opening 211 is defined in the mounting body 21 corresponding to the securing portion 13 of the absorbing dish 10. The mounting opening 211 defines a wide part 2111 and a narrow part 2113 communicating with the wide part 2111. In an embodiment, the wide part 2111 and the narrow part 2113 are both circular, or circle-segments. The securing portion 13 of the absorbing dish 10 can extend into the wide part 2111. The mounting bracket 20 includes a positioning portion 213 extending from the mounting body 21 corresponding to the narrow part 2113. In an embodiment, the positioning portion 213 is substantially semicircular, and the diameter D1 of the semicircle defined by the positioning portion 213 is smaller than the diameter D2 of the circle defined by the securing portion 13. The mounting bracket 20 further includes a stopper portion 215 extending from the mounting body 21 corresponding to the wide part 2111. The mounting bracket 20 further includes a mounting protrusion 217 extending from the mounting body 21. In an embodiment, the shape of the mounting protrusion 217 together with the positioning portion 213 resembles an arch. Two mounting holes 219 are defined in the mounting body 21.

Figure 3:
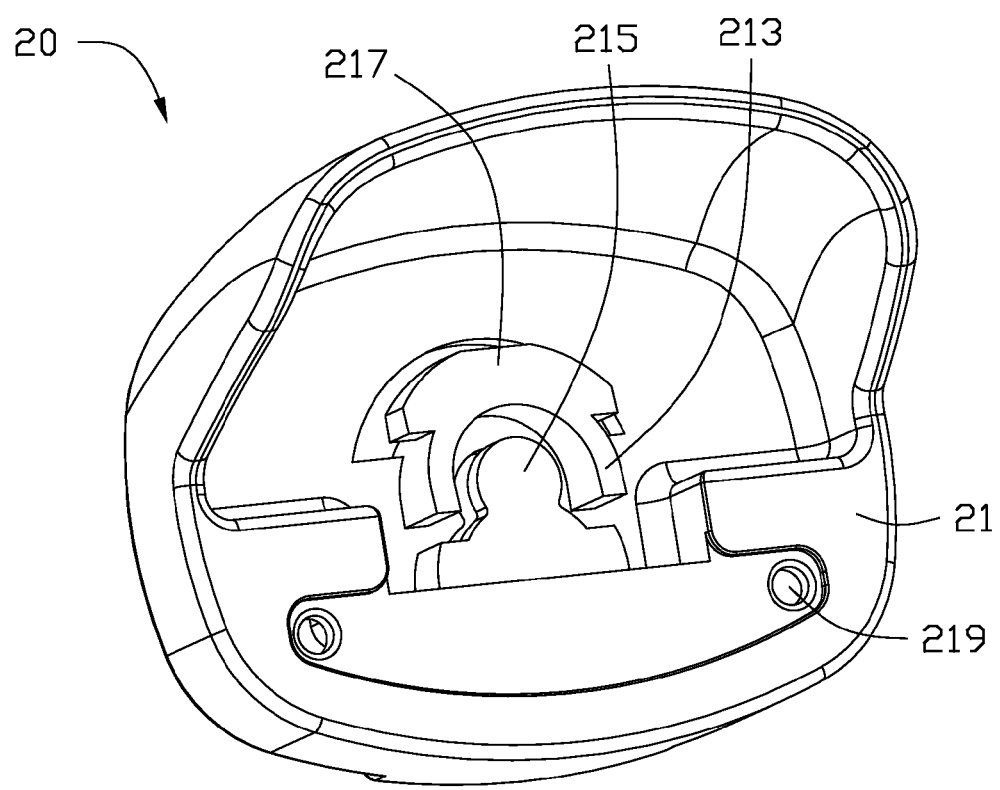
FIG. 3 is an isometric view of a mounting bracket of FIG. 1.

Referring to FIG. 1 to FIG. 3, the placing member 30 includes a main body 31 and a mounting portion 32 extending from the main body 31. The main body 31 includes a placing portion 311 and two hooks 313 extending from the placing portion 311. A separating opening 315 is defined between the two hooks 313. The placing member 30 includes two securing protrusions 33 extending from the main body 31. In an embodiment, each securing protrusion 33 is a tapered dowel. The securing protrusions 33 correspond to the mounting holes 219. The mounting portion 32 defines a mounting recess 321 for receiving the mounting protrusion 217. The mounting recess 321 has a mounting flange 323 corresponding to the mounting protrusion 217.

Figure 4:
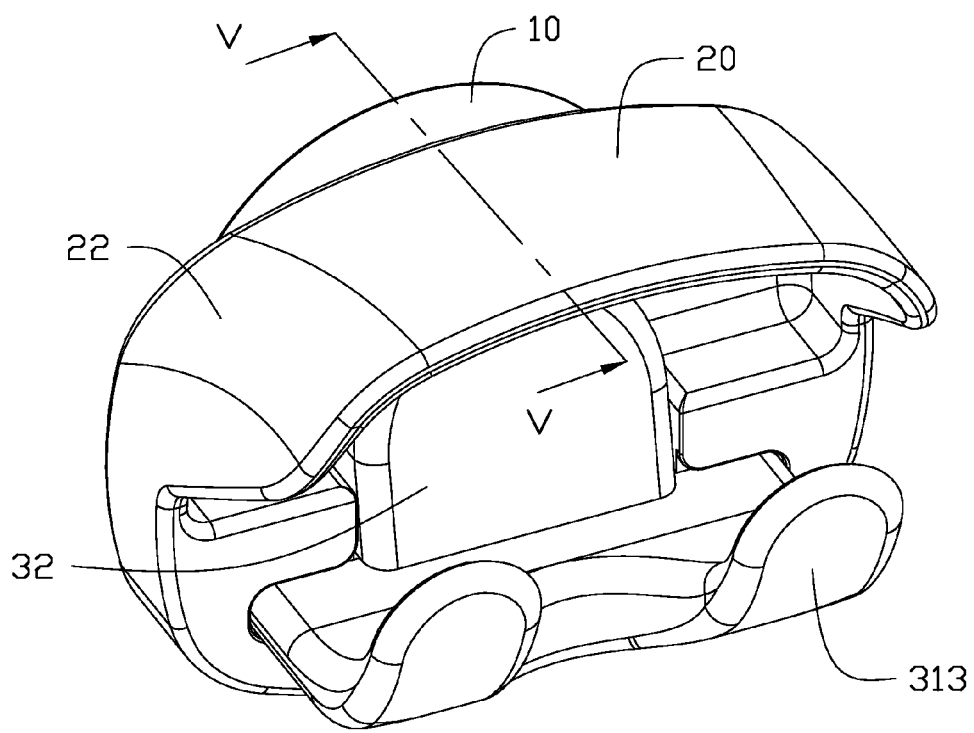
FIG. 4 is a view of the bracket of FIG. 1 assembled.
Figure 5:
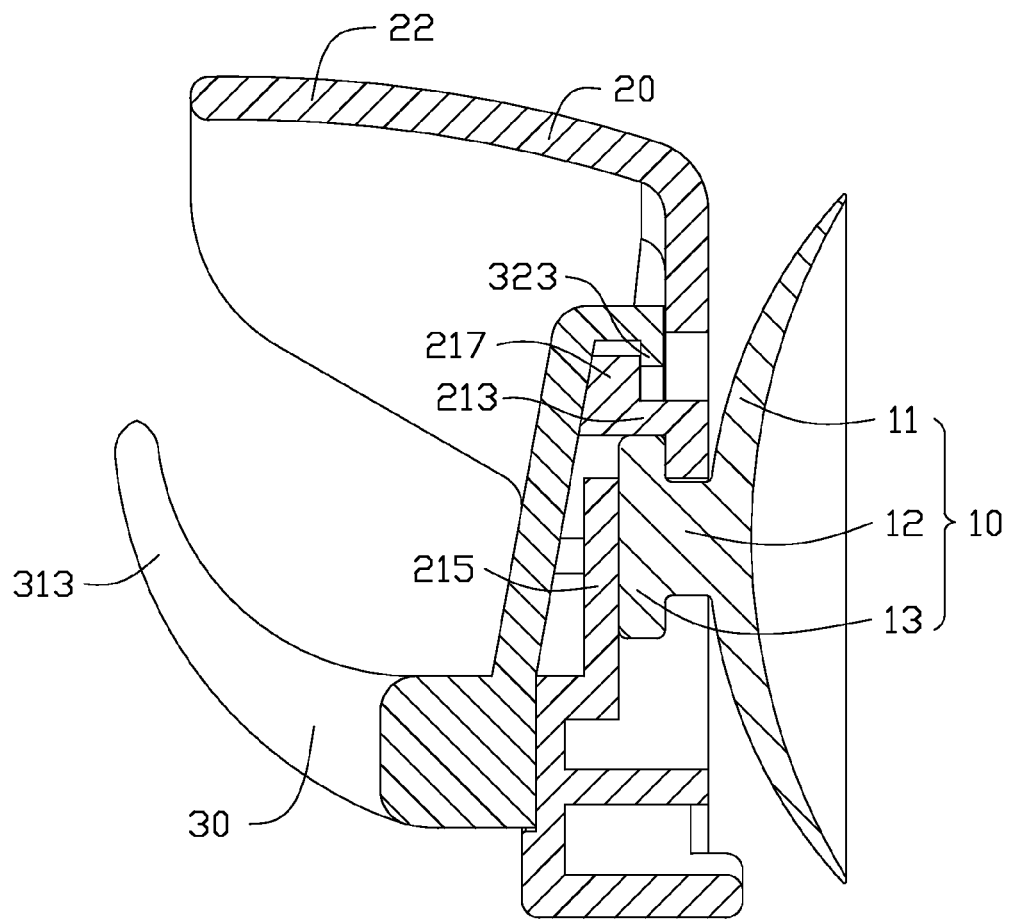
FIG. 5 is a cross-sectional view of the temporary bracket of FIG. 4, taken along the line V-V.

Referring to FIGS. 4 and 5, in assembly, the mounting protrusion 217 is received in the mounting recess 321 of the placing member 30. The mounting protrusion 217 is disposed in an inner side of the mounting flange 323. The main body 31 is pressed downward to enable the securing protrusions 33 to engage the mounting holes 219. In one embodiment, the securing protrusion 33 are an interference fit in the mounting holes 219. The securing portion 13 of the absorbing dish 10 extends through the wide part 2111 of the mounting opening 211 and is moved to the narrow part 2113. The neck portion 12 is disposed in the narrow part 2113 and the securing portion 13 is received in the positioning portion 213.

Figure 6:
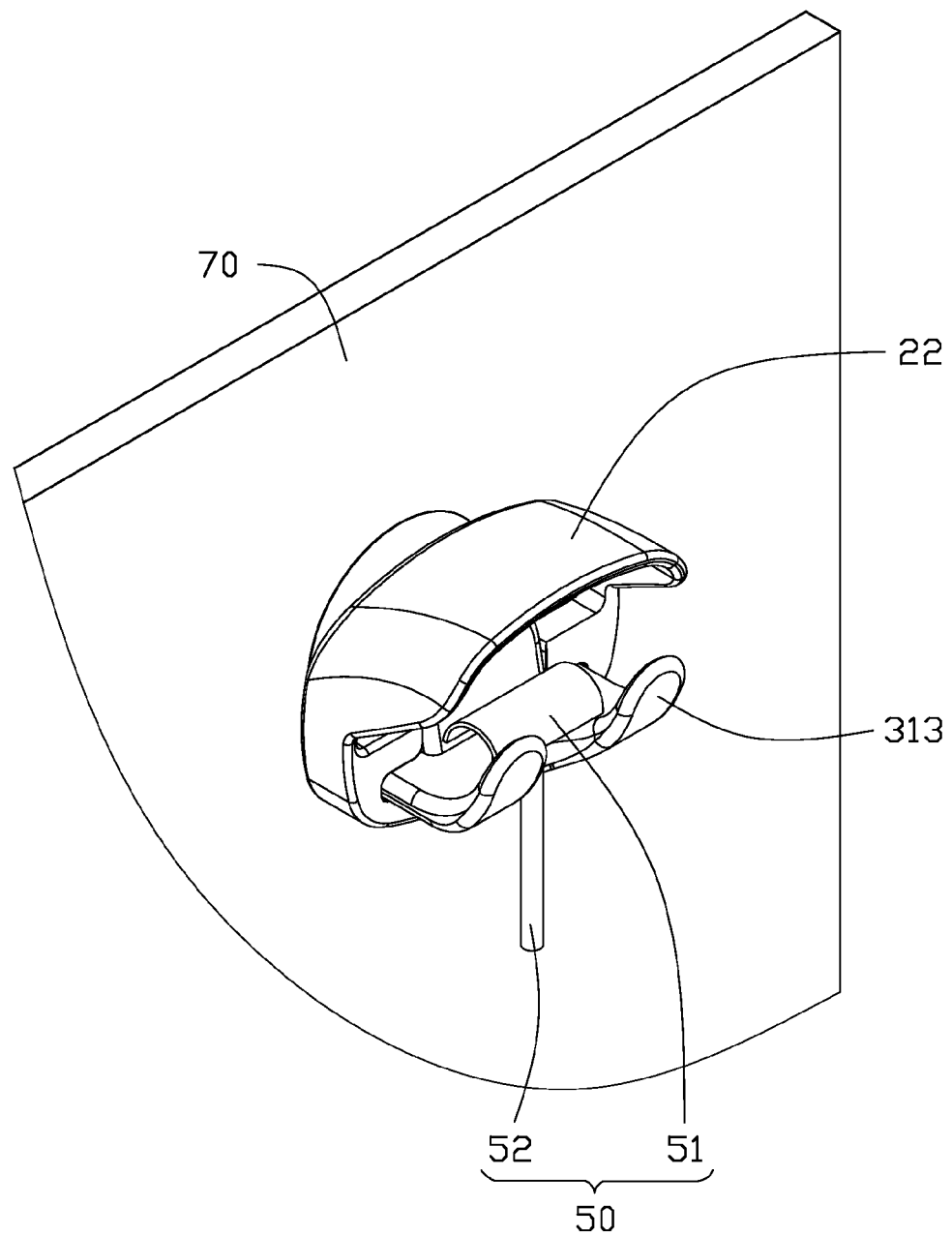
FIG. 6 is an isometric view of the temporary bracket in use.

Referring to FIG. 6, in use, the absorbing body 11 of the absorbing dish 11 is pressed against a surface, such as a wall 70, to drive out the air within the body 11 and secure the temporary bracket to the wall 70 by atmospheric pressure. The shaving razor 50 includes a razor body 51 and a handle 52 extending from the razor body 51. The razor body 51 is placed on the placing portion 311 to enable the handle 52 to be disposed in the separating opening 315, the existence of the opening 315 allows a great variety of items to be conveniently retained by the member 30.

It is to be understood, however, that even though numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A temporary bracket comprising:
   a mounting bracket, the mounting bracket comprising a mounting body and a positioning portion extending from the mounting body, a mounting opening defined in the mounting body, the mounting opening comprising a wide part and a narrow part communicating with the wide part, and the positioning portion extending from an edge of the narrow part to surround the narrow part;
   an absorbing dish, the absorbing dish comprising a suction cup for sucking a surface, a neck portion extending from the suction cup, and a securing portion extending from the neck portion, the neck portion received in the narrow part, and the securing portion resiliently resisting the positioning portion; and the securing portion adapted to extend into the wide part and be moved to the narrow part to enable the neck portion to be received in the narrow part; and a placing member secured to the mounting bracket for supporting an object;

wherein the mounting bracket further comprises a mounting protrusion extending from the positioning portion, the placing member comprises a mounting portion, and the mounting portion defines a mounting recess receiving the mounting protrusion.

2. The temporary bracket of claim 1, wherein the securing portion is circular shaped, the positioning portion is substantially semicircular shaped, and the diameter of the semicircle defined by the positioning portion is less than the diameter of the circle defined by the securing portion.

3. The temporary bracket of claim 1, wherein the mounting bracket further comprises a stopper portion extending from the mounting body, and the stopper portion prevents the securing portion from moving along a direction in which the securing portion extends into the wide part.

4. The temporary bracket of claim 1, wherein the mounting recess has a mounting flange, and the mounting protrusion is received in an inner surface of the mounting flange to be prevented from moving away from the placing member.

5. The temporary bracket of claim 1, wherein the placing member comprises a securing protrusion, and the mounting bracket defines a mounting hole receiving the securing protrusion.

6. The temporary bracket of claim 5, wherein the placing member further comprises a main body and a mounting portion extending from the main body and connected to the mounting bracket, and the securing protrusion extends from the main body.

7. The temporary bracket of claim 6, wherein the main body further comprises a placing portion and two hooks extending from the placing portion, and the main body defines a separating opening between the two hooks.

8. The temporary bracket of claim 1, wherein the mounting bracket further comprises a cover tab extending from the mounting body, and the cover tab and the placing member are disposed on the same side of the mounting body.

9. A temporary bracket comprising:
a mounting bracket, the mounting bracket comprising a mounting body and a positioning portion extending from the mounting body, the mounting body defining a mounting opening, the mounting opening comprises a wide part and a narrow part communicating with the wide part, and the positioning portion extending from an edge of the narrow part to surround the narrow part;

an absorbing dish, the absorbing dish comprising a suction cup for sucking a surface, a neck portion extending from the suction cup, and a securing portion extending from the neck portion, the neck portion disposed in the narrow part of the mounting opening; the securing portion resiliently resisting the positioning portion; the securing portion adapted to extend into the wide part and be moved to the narrow part to enable the neck portion to be received in the narrow part; and the securing portion and the suction cup disposed on opposite sides of the mounting body; and a placing member secured to the mounting bracket for supporting an object, the placement member and the suction cup disposed on opposite sides of the mounting body, the placing member comprising two hooks to prevent the object from moving a direction substantially perpendicular to the mounting body;

wherein the placing member comprises a securing protrusion and the mounting bracket defines a mounting hole receiving the securing protrusion.

10. The temporary bracket of claim 9, wherein the securing portion is circular shaped, the positioning portion is substantially semicircular shaped, and the diameter of the semicircle defined by the positioning portion is less than the diameter of the circle defined by the securing portion.

11. The temporary bracket of claim 9, wherein the mounting bracket comprises a mounting protrusion extending from the mounting body and the placing member comprises a mounting portion, the mounting portion defines a mounting recess receiving the mounting protrusion.

12. The temporary bracket of claim 11, wherein the mounting recess has a mounting flange and the mounting protrusion is received in an inner surface of the mounting flange.

13. The temporary bracket of claim 9, wherein the placing member comprises a main body and a mounting portion extending from the main body and connected to the mounting bracket, and the securing protrusion extends from the main body.

14. The temporary bracket of claim 13, wherein the main body comprises a placing portion, the two hooks extends from the placing portion, and the main body defines a separating opening between the two hooks.

15. The temporary bracket of claim 9, wherein the mounting bracket further comprises a cover tab extending from the mounting body, the cover tab and the placing member are disposed on the same side of the mounting body.

\* \* \* \* \*